United States Patent [19]

Alcock et al.

[11] Patent Number: 5,743,295
[45] Date of Patent: Apr. 28, 1998

[54] VALVE CONSTRUCTION AND METHOD OF USE

[75] Inventors: Alan J. Alcock, Mundelein; Jeffrey Y. Pan, Lake Forest; Karen A. Egan, Gurnee; Tung-Ming Huang, Buffalo Grove, all of Ill.

[73] Assignee: Abbott Laboratories, Abbott Park, Ill.

[21] Appl. No.: 686,297

[22] Filed: Jul. 25, 1996

Related U.S. Application Data

[63] Continuation of Ser. No. 504,986, Jul. 20, 1995, abandoned.
[51] Int. Cl.$^6$ ............................................. F16K 11/10
[52] U.S. Cl. ............................................. 137/599; 251/61.1
[58] Field of Search ............................. 251/61.1; 137/884, 137/599

[56] References Cited

U.S. PATENT DOCUMENTS

| | | |
|---|---|---|
| 3,083,943 | 4/1963 | Stewart, Jr. et al. . |
| 3,286,977 | 11/1966 | Miottel . |
| 3,477,693 | 11/1969 | Bezanis . |
| 3,600,953 | 8/1971 | Isreeli et al. . |
| 3,616,783 | 11/1971 | La Masters ...................... 251/61.1 X |
| 3,749,353 | 7/1973 | Pauliukonis . |
| 3,787,026 | 1/1974 | Lazar ............................ 251/61.1 X |
| 3,850,371 | 11/1974 | Trapp ............................ 239/113 |
| 3,934,611 | 1/1976 | Gachot et al. . |
| 4,070,004 | 1/1978 | Friswell . |
| 4,119,120 | 10/1978 | Mehaffy et al. . |
| 4,168,724 | 9/1979 | Graffunder et al. . |
| 4,221,361 | 9/1980 | Weingarten ...................... 251/61.1 X |

(List continued on next page.)

FOREIGN PATENT DOCUMENTS

| | | |
|---|---|---|
| 4340533 | 11/1993 | Denmark . |
| 0420296 | 4/1991 | European Pat. Off. . |
| 0562694 | 9/1993 | European Pat. Off. . |

OTHER PUBLICATIONS

Branebjerg, J., et al., "A New Electrostatic Actuator providing improved Stroke length and Force", *Micro Electro Mechanical Systems*, 6–11 (1992).

Huff, M. A., et al., "A Pressure-Balanced Electrostatically-Actuated Microvalve", Microsystems Technology Laboratories, Mass. Institute of Technology, Cambridge, MA 02139, 123–127 (1990).

Huff, M. A., et al., "A Threshold Pressure Switch Utilizing Plastic Deformation of Silicon", Microsystems Technology Laboratories, Mass. Institute of Technology, Cambridge, MA 02139, 177–180 (1991).

Jensen, D. F., et al., "Pneumatic Digital Control of a Synchronous Device", *Fluidics Quarterly* 1/1:27–37 (1967).

Manning, J. R., "Fluidic Control Devices and Systems", *Fluidics Quarterly*, 1–13 (1970).

Ohnstein, T., "Micromachined Silicon Microvalve", Sensor and System Development Center, Honeywell, Inc., Bloomington, MN., 95–98 (1990).

*Primary Examiner*—John Fox
*Attorney, Agent, or Firm*—Mark C. Bach

[57] ABSTRACT

Embodiments described herein provide a valve construction. One embodiment comprises a first valve and a second valve. A first fluid conveying conduit fluidly conveying a first fluid is fluidly connected with the first valve. A second fluid conveying conduit fluidly conveying a second fluid is fluidly connected with the second valve. A third fluid conveying conduit is fluidly connected with the first valve and the second valve. The first valve is movable between a first position where first fluid flows between the first fluid conveying conduit and the third fluid conveying conduit, and a second position where first fluid does not flow between the first fluid conveying conduit and the third fluid conveying conduit. The second valve is movable between a first position where the second fluid flows between the second fluid conveying conduit and the third fluid conveying conduit, and a second position where the second fluid does not flow between the second fluid conveying conduit and the third fluid conveying conduit.

9 Claims, 3 Drawing Sheets

U.S. PATENT DOCUMENTS

| | | |
|---|---|---|
| 4,239,494 | 12/1980 | Clements . |
| 4,259,291 | 3/1981 | Smythe . |
| 4,304,257 | 12/1981 | Webster . |
| 4,306,587 | 12/1981 | Tchebinyayeff ................... 137/884 X |
| 4,353,243 | 10/1982 | Martin . |
| 4,399,362 | 8/1983 | Cormier et al. . |
| 4,479,762 | 10/1984 | Bilstad et al. . |
| 4,516,604 | 5/1985 | Taplin ................... 251/61.1 X |
| 4,517,302 | 5/1985 | Saros . |
| 4,601,881 | 7/1986 | Webster . |
| 4,627,465 | 12/1986 | Kolibas ................... 137/884 X |
| 4,655,328 | 4/1987 | Tideberg ................... 188/352 |
| 4,848,722 | 7/1989 | Webster . |
| 4,852,851 | 8/1989 | Webster . |
| 4,853,336 | 8/1989 | Saros et al. . |
| 4,858,883 | 8/1989 | Webster . |
| 5,045,473 | 9/1991 | Cassaday et al. . |
| 5,149,658 | 9/1992 | Cassaday et al. . |
| 5,391,353 | 2/1995 | Graffunder . |

VALVE CONSTRUCTION AND METHOD OF USE

This application is a continuation of application Ser. No. 08/504,986 filed Jul. 20, 1995 now abandoned.

BACKGROUND OF THE INVENTION

Embodiments described herein relate generally to a valve, and more specifically to a valve construction comprising at least two valves.

A number of valves are well known in the relevant art. One type of a valve is a three-way valve. A three-way valve generally comprises two inlets and a common outlet. Alternatively, the three-way valve generally comprises a common inlet and two outlets. The configuration of the three-way valve may resemble the letter Y. These valves may be used to perform a number of tasks, such as moving fluid, mixing fluid, selecting a fluid flow path, etc.

While a three-way valve may be effective in certain uses, there is always room for improvement. For instance, a three-way valve may be relatively large and bulky. Thus, it may be difficult to use a three-way valve in tight places, such as inside a complex analytical instrument. The three-way valve may be relatively difficult to assemble and to service or to repair. Given the structure of the three-way valve, if it is desired to clean one portion of the valve, such as one of the two inputs, the common output must be occupied during the cleaning cycle. Thus, it is not easily possible to clean one portion of the three-way valve while using another portion of the valve. Also, there may be significant "dead volume," that is places where fluid may be trapped, in the three-way valve. This trapped or dead fluid may cause contamination of other fluids later passing through the three-way valve. Furthermore, the amount of cleaning fluid used may be relatively large and the time needed for cleaning may be relatively long, thereby possibly reducing the time during which the valve is operational.

In other constructions, such as a shear valve and the like, relatively rotating faces associated with the valve contact each other. This contact can cause the shear valve to wear or to deteriorate over time causing fluid to be trapped, i.e. smeared, between two worn faces.

Given these concerns, it is desirable to provide a new construction of a valve.

SUMMARY OF THE INVENTION

Embodiments described herein provide a valve construction. One embodiment comprises a first valve and a second valve. A first fluid conveying conduit fluidly conveying a first fluid is fluidly connected with the first valve. A second fluid conveying conduit fluidly conveying a second fluid is fluidly connected with the second valve A third fluid conveying conduit is fluidly connected with the first valve and the second valve. The first valve is movable between a first position where first fluid flows between the first fluid conveying conduit and the third fluid conveying conduit, and a second position where first fluid does not flow between the first fluid conveying conduit and the third fluid conveying conduit. The second valve is movable between a first position where the second fluid flows between the second fluid conveying conduit and the third fluid conveying conduit, and a second position where the second fluid does not flow between the second fluid conveying conduit and the third fluid conveying conduit.

Another embodiment offers a valve construction comprising a first fluid conveying conduit conveying a first fluid. A first valve is fluidly connected with the first fluid conveying conduit. The first valve moves between a first position where first fluid flows through the first valve and a second position where first fluid does not flow through the first valve. A second fluid conveying conduit conveying a second fluid is fluidly connected with a second valve. The second valve moves between a first position where second fluid flows through the second valve and a second position where second fluid does not flow through the second valve. A third fluid conveying conduit is fluidly connected with both the first valve and the second valve for conveying at least one of the first fluid and the second fluid.

Yet a further embodiment provides a valve construction comprising a first fluid conveying conduit having a first end and a second end. A first valve is fluidly connected with the first end of the first fluid conveying conduit. The first valve moves between a first position where fluid flows between the first fluid conveying conduit and the first valve and a second position where fluid does not flow between the first fluid conveying conduit and the first valve. A second valve is fluidly connected with the second end of the first fluid conveying conduit. The second valve moves between a first position where fluid flows between the first fluid conveying conduit and the second valve and a second position where fluid does not flow between the first fluid conveying conduit and the second valve.

DETAILED DESCRIPTION OF PREFERRED EMBODIMENTS

Embodiments described herein comprise an arrangement or construction of a valve. In some embodiments, the valve construction comprises at least two valves. The construction may comprise any desired number of valves. The embodiments may be used in any desirable employment with any desirable fluid. For example, the embodiments may be used in three-way valving, substantially simultaneous fluid integration, fluid metering, etc. An example of fluid metering is disclosed in copending U.S. patent application Ser. No. 08/334,902. That application is assigned to the assignee of the present case and the disclosure thereof is incorporated herein in its entirety by this reference. The valve used in a given embodiment may be of any suitable structure, and may be substantially similar to the valves disclosed in co-pending U.S. patent application Ser. No. 08/401,582. That application is assigned to the assignee of the present case and the disclosure thereof is incorporated herein in its entirety by this reference. The valves may be controlled in any desirable manner, such as pneumatically, mechanically, electrically, electrostatically and the like. Also, steps of constructing or using an embodiment described herein may be performed in any desirable order, or may be mixed with steps from another method to yield additional methods. Further, while the embodiments are discussed herein with a particular direction of fluid flow for clarity, it is to be understood that the fluid may flow in any appropriate direction, for instance, by properly choosing applied fluid pressures or pressure differentials. Additionally, the various valve constructions described herein may be joined and/or duplicated and joined in any appropriately desirable fashion.

Figure 1:
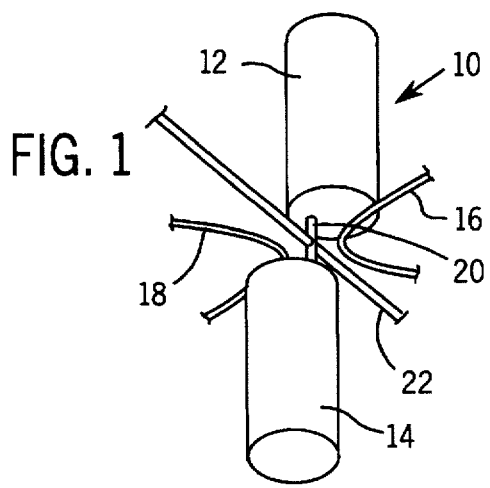
FIG. 1 is a generic view of a valve construction described herein.

Referring specifically to FIG. 1, illustrated is a valve construction 10 comprising a first valve 12 and a second valve 14. A first fluid conveying conduit 16 is fluidly connected with the first valve 12. The fluid connection between the first fluid conveying conduit 16 and the first valve 12 may allow fluid to flow through the first fluid conveying conduit 16 irrespective of position of the first valve 12. In other words, the first fluid conveying conduit 16 may end at the first valve 12 or the first fluid conveying conduit 16 may "flow through" the first valve 12.

A second fluid conveying conduit 18 is fluidly connected with the second valve 14. The fluid connection between the second valve 14 and the second fluid conveying conduit 18 may allow fluid to flow through the second fluid conveying conduit 18 irrespective of position of the second valve 14. In other words, the second fluid conveying conduit 18 may end at the second valve 14 or the second fluid conveying conduit 18 may "flow through" the second valve 14.

A third fluid conveying conduit 20 is fluidly connected between the first valve 12 and the second valve 14. The dimensions of the third fluid conveying conduit 20 may be predetermined to facilitate the particular employment of the valve construction 10. For instance, if the valve construction 10 were to be used to meter a volume of fluid, then the dimensions of the third fluid conveying conduit 20 may be chosen to correspond to an amount of fluid desired to be metered. In other embodiments of the valve construction 10, the dimensions of the third fluid conveying conduit 20 may be chosen to reduce a volume of fluid retained or trapped within the third fluid conveying conduit 20, i.e. to reduce fluid "dead volume."

The first valve 12 is movable between a first position where a first fluid flows between the first fluid conveying conduit 16 and the third fluid conveying conduit 20 and a second position where first fluid does not flow between the first fluid conveying conduit 16 and the third fluid conveying conduit 20. The second valve 14 is movable between a first position where a second fluid flows between the second fluid conveying conduit 18 and the third fluid conveying conduit 20 and a second position where second fluid does not flow between the second fluid conveying conduit 18 and the third fluid conveying conduit 20. In some embodiments, the first and second fluids may be identical.

In one embodiment of the valve construction 10, the first valve 12 and the second valve 14 are relatively positioned such that complementary structures of each valve 12 and 14 substantially oppose each other. In still other embodiments, an axis of the first valve 12 is parallelly offset from an axis of the second valve 14. As shown more clearly in FIG. 2, opposing surfaces of the first valve 12 and the second valve 14 may be offset by a preselected distance to determine a dimension, and thereby a fluid volume, of the third fluid conveying conduit 20.

Figure 2:
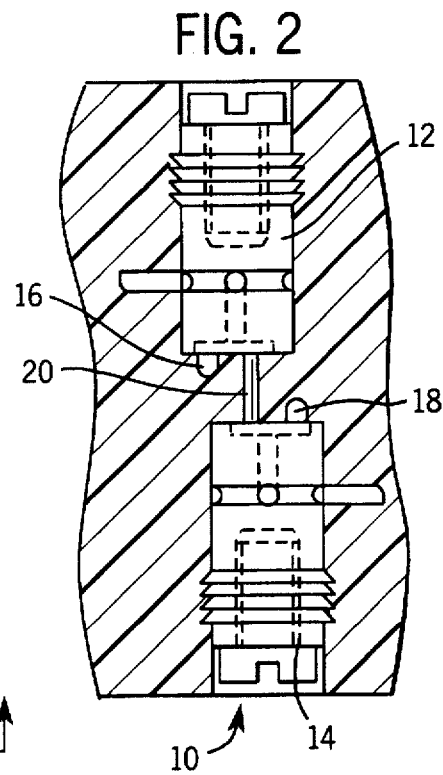
FIG. 2 is a partially sectioned view of another valve construction described herein.

The construction 10 of FIG. 2 differs from that of FIG. 1 in that the construction 10 of FIG. 2 comprises the first and second valves 12 and 14 being integrated in a body, such as a polymeric body and the like.

A fourth fluid conveying conduit 22 is fluidly connected with the third fluid conveying conduit 20 such that fluid can flow between the third fluid conveying conduit 20 and the fourth fluid conveying conduit 22.

Figure 3:
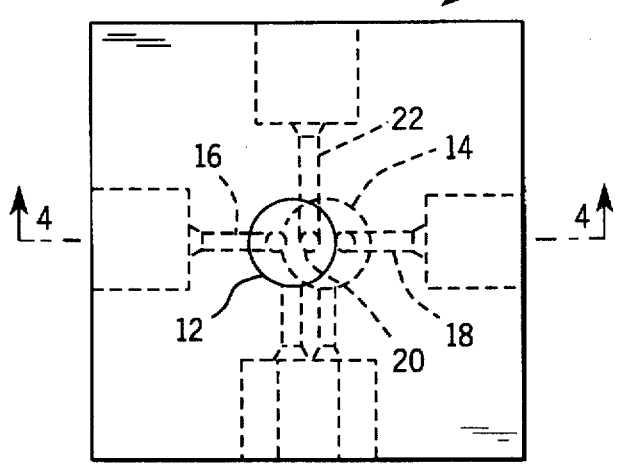
FIG. 3 is an elevational view of an additional valve construction described herein.
Figure 4:
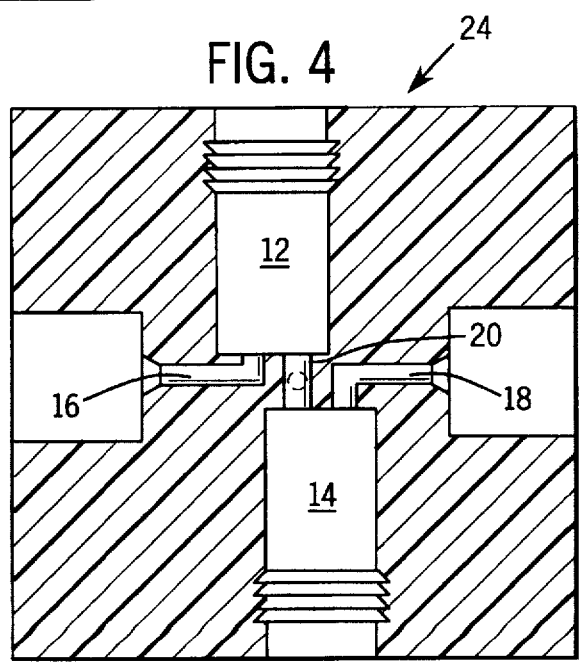
FIG. 4 is a sectional view taken along line 4—4 of FIG. 3.

Another valve construction 24, substantially similar to the valve construction 10 is illustrated in FIGS. 3 and 4. For the sake of clarity of understanding, substantially similar structures will be designated with like reference characters.

The valve construction 24 may be used, e.g., to selectively move first fluid from the first fluid conveying conduit 16 and/or second fluid from the second fluid conveying conduit 18 to the third fluid conveying conduit 20 and from there to the fourth fluid conveying conduit 22. The fluid flow directions can, of course, be changed. The valve construction 24 can perform this fluid movement with reduced chances of unintended mixing, contaminating or diluting of the first and second fluids and/or the first and second fluid conveying conduits 16 and 18 due to the small size of the third fluid conveying conduit 20.

Illustrating further by operational example, the first valve 12 is moved to its first position, thereby allowing first fluid to flow from the first fluid conveying conduit 16 toward the third fluid conveying conduit 20 and the fourth fluid conveying conduit 22. At the same time, the second valve 14 is moved toward its second position thereby limiting flow of second fluid from the second fluid conveying conduit 18 toward the third fluid conveying conduit 20 and the fourth fluid conveying conduit 22.

If desired, a fluid pressure differential can exist between fluid present in the fourth fluid conveying conduit 22 and the first fluid flowing from the first fluid conveying conduit 16. Thus, with the first valve 12 in its first position and the second valve 14 in its second position, first fluid flows from the first fluid conveying conduit 16 into the fourth fluid conveying conduit 22 via the third fluid conveying conduit 20. This orientation is maintained until a desired amount of first fluid has passed into the fourth fluid conveying conduit 22.

After the desired amount of first fluid is present within the fourth fluid conveying conduit 22, the positions of the first and second valves 12 and 14 are changed. Specifically, the first valve 12 is moved toward its second position where flow of first fluid from the first fluid conveying conduit 16 into the third fluid conveying conduit 20 is limited. Theretofore, the second valve 14 is moved toward its first position where second fluid flows from the second fluid conveying conduit 18 into the third fluid conveying conduit 20. Due to a pressure differential between the fluid in the fourth fluid conveying conduit 22 and the second fluid in the second fluid conveying conduit 18, second fluid passes into the fourth fluid conveying conduit 22.

Because the dimensions of the third fluid conveying conduit 20 have been chosen appropriately, i.e. reduced or minimized, a change from first fluid flowing into the fourth fluid conveying conduit 22 to second fluid flowing into the fourth fluid conveying conduit 22 occurs substantially instantaneously. This substantially instantaneous change from first fluid flow to second fluid flow reduces the probability of unintended mixing of first fluid and second fluid along with little or no first fluid remaining in the third fluid conveying conduit 20, viz. with reduced first fluid dead volume.

If it were desired to mix first fluid and second fluid, then the construction 24 can be used in substantially the same manner as described above. However, if mixing, i.e. diluting, of first and second fluids were desired, then both the first valve 12 and the second valve 14 would be moved toward their respective first positions substantially simultaneously. A desired ratio of dilution of first and second fluids may be achieved by appropriately determining a time period during which both the first and second valves 12 and 14 remain in their respective first positions.

Also, it is to be recognized that a direction of fluid flow, relative fluid pressures, etc. may be changed. For example, fluid flow may be changed such that a fluid present in the fourth fluid conveying conduit 22 may be selectively transferred to the first and/or second fluid conveying conduits 16 and 18. The construction 24 may be used to transfer second fluid from the second fluid conveying conduit 18 to the first fluid conveying conduit 16 and/or the fourth fluid conveying conduit 22. Alternatively, the construction 24 may be utilized to transfer first fluid from the first fluid conveying conduit 16 to the second fluid conveying conduit 18 and/or the fourth fluid conveying conduit 22.

An additional valve construction 26, substantially similar to the valve construction 24, hence the like reference characters, allows for, in addition to the above-discussed benefits, independent cleaning or flushing of the fluid conveying conduits 16, 18, 20 and 22. In the valve construction 26, the first fluid conveying conduit 16 passes through the first valve 12. The second fluid conveying conduit 18 passes through the second valve 14 Ends of the third fluid conveying conduit 20 are defined by the first and second valves 12 and 14. The fourth fluid conveying conduit 22 either passes through the third fluid conveying conduit 20 or an end of the fourth fluid conveying conduit 22 is defined by the third fluid conveying conduit 20.

The valve construction 26 operates substantially similarly to the valve constructions 10 and 24. However, the valve construction 26 allows at least one of the fluid conveying conduits 16, 18, 20 and 22 to be flushed while the first valve 12 and/or the second valve 14 are in their respective second positions and/or while fluid flows in the fluid conveying conduits 16, 18, 20 and 22 not being flushed. More specifically, the valve construction 26 allows the first fluid conveying conduit 16 and the second fluid conveying conduit 18 to be washed independent of position of the first valve 12 and/or the second valve 14. The valve construction 26 allows the third fluid conveying conduit 20 and the fourth fluid conveying conduit 22 to be washed if either the first valve 12 or the second valve 14 are in their respective first positions.

For example, the first valve 12 may be moved into its first position, thereby allowing first fluid to flow from the first fluid conveying conduit 16 into the third fluid conveying conduit 20 and the fourth fluid conveying conduit 22. Because the second valve 14 is in its second position, the second fluid conveying conduit 18 may be flushed without affecting operation of the remainder of the valve construction 26. The same is true for the first valve 12 and the first fluid conveying conduit 16. Additionally, in suitable constructions, the third and fourth fluid conveying conduits 20 and 22 may be flushed, e.g. when at least one of the first and second valves 12 and 14 is in its first position, etc.

In other embodiments, the valve constructions 10, 24 and 26 can be used to meter a desired volume of fluid. In these embodiments, the valve constructions 10, 24 and 26 may be modified to substantially fluidly isolate the third fluid conveying conduit 20, such as by eliminating the fourth fluid conveying conduit 22, placing a valve fluidly between the third fluid conveying conduit 20 and the fourth fluid conveying conduit 22, etc. These embodiments may meter an amount of fluid corresponding to predetermined dimensions of the third fluid conveying conduit 20. For instance, the dimensions of the third fluid conveying conduit 20 may be predetermined such that, in one employment, the third fluid conveying conduit 20 contains about 0.5 µl of fluid. Thus, these embodiments may meter an amount of fluid as small as about 0.5 µl.

Illustrating by example, the first fluid conveying conduit 16 passes through the first valve 12 and the second fluid conveying conduit 18 passes through the second valve 14. The first valve 12 and the second valve 14 are moved to their respective first positions. First fluid flows from the first fluid conveying conduit 16 through the first valve 12, the third fluid conveying conduit 20 and the second valve 14 to the second fluid conveying conduit 18. The second valve 14 is moved to its second position and then the first valve 12 is moved to its second position. The third fluid conveying conduit 20 contains a precise amount of first fluid corresponding to the predetermined dimensions of the third fluid conveying conduit 20.

If desired, the first fluid conveying conduit 16 and/or the second fluid conveying conduit 18 can be flushed with a suitable fluid. Then, another fluid is conveyed in the first fluid conveying conduit 16. The first valve 12 and the second valve 14 are moved to their respective first positions. The desired amount of first fluid metered by the third fluid conveying conduit 20 passes with the another fluid into the second fluid conveying conduit 18.

Given these structures, a number of different utilizations of the valve constructions 10, 24 and 26 are possible. For instance, using the valve construction 26 for illustrative purposes only, the valve construction 26 may be used to dispense a predetermined volume of a particular fluid, such as a reagent and the like, used in an analytical instrument.

In one exemplary embodiment, the valve construction 26 may be used to control dispense of a sample, a first reagent and a second reagent. The first reagent is conveyed by the first fluid conveying conduit 16 and the second reagent is conveyed by the second fluid conveying conduit 18. The amounts of first and second reagent may be metered by any suitable technique, such as those described above, possibly performed in previous series of valve constructions 10, 24 and 26, or those described in the referenced co-pending U.S. Patent applications. A metered amount of sample is contained in the third fluid conveying conduit 20. The amount of sample contained in the third fluid conveying conduit 20 may be determined, e.g., by the fluid metering method described above.

An amount of first reagent may be moved toward the third fluid conveying conduit 20 by moving the first valve 12 toward its first position. The second valve 14 may be maintained in its second position. Then, an amount of second reagent may be moved toward the third fluid conveying conduit 20 by moving the first valve 12 toward its second position and moving the second valve 14 toward its first position. Thereafter, the mixed fluids may be moved by suitable techniques into the first fluid conveying conduit 16, the second fluid conveying conduit 18 or the fourth fluid conveying conduit 22, as desired. Thus, it is possible to have a predetermined amount of sample mixed with predetermined amounts of first and second reagents. It is apparent that any desired number of fluids may be mixed, i.e. integrated, in this manner.

Figure 7:
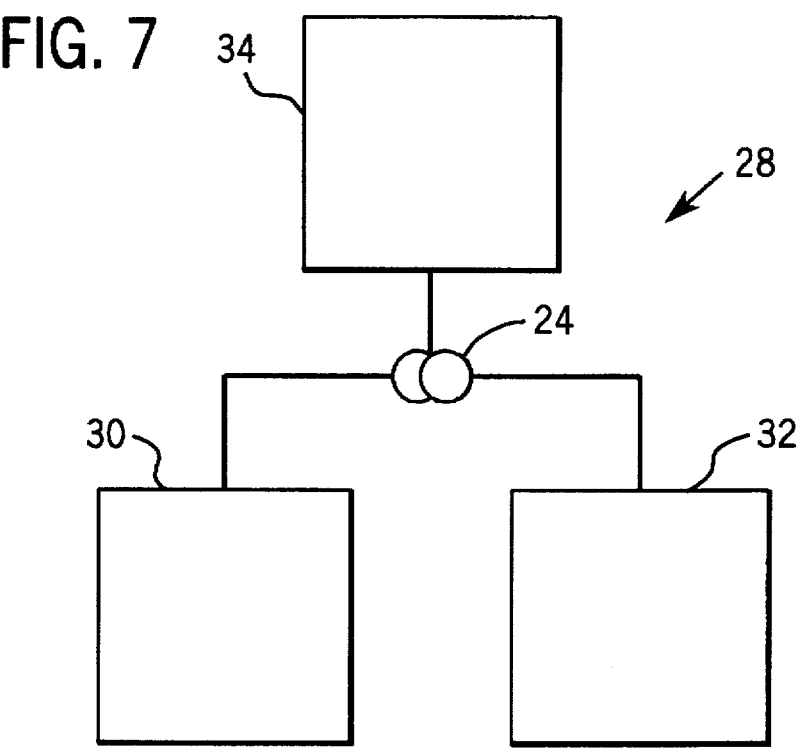
FIG. 7 is a block diagram of a valve construction described herein utilized in a particular employment.

Another employment of the valve construction 10, 24 and 26 is illustrated in FIG. 7. Here, the valve construction, which may be substantially similar to the valve construction 24, is used with a blood analyzer 28, such as the Cell-Dyn 3500 available from Abbott Laboratories of Santa Clara, Calif. The valve construction 24 directs fluid, such as a blood sample and the like, from a first source 30, such as a manual sample handler, and a second source 32, such as an automated sample handler, to a processor 34.

Figure 5A:
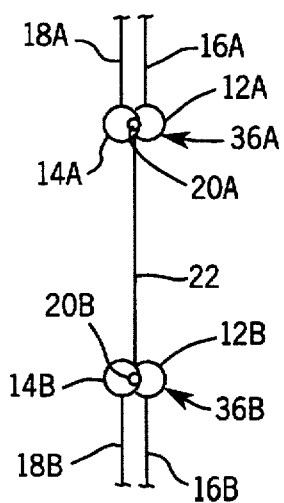
FIG. 5A is a schematic view of a further valve construction described herein.
Figure 5B:
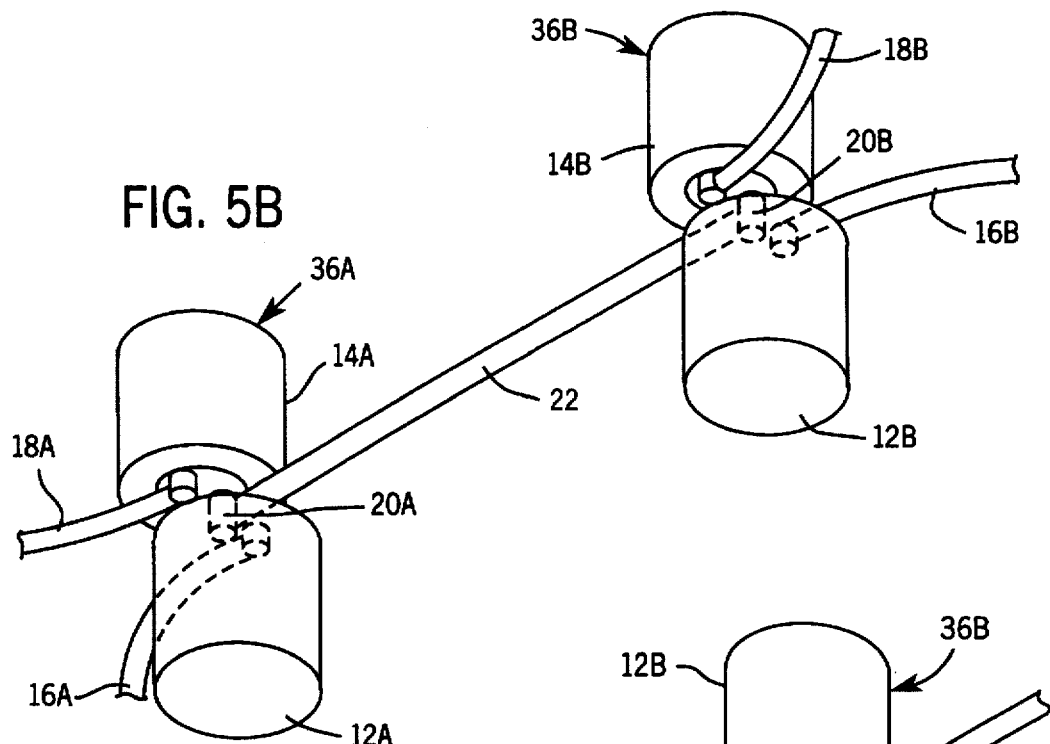
FIG. 5B is a generic isometric view of the valve construction illustrated in FIG. 5A.

Still an additional employment is illustrated in FIGS. 5A and 5B. This employment measures or meters a fluid volume. As shown, at least two valve constructions 36A and 36B, each of which may be substantially similar to the valve constructions 10, 24 and 26, hence the like element names and reference characters, are fluidly connected by their third fluid conveying conduits 20A and 20B to the fourth fluid conveying conduit 22. The dimensions of the third fluid conveying conduits 20A and 20B and of the fourth fluid conveying conduit 22 are predetermined to correspond to a desired amount of fluid to be metered. Of course, in suitable constructions, the dimensions of the third fluid conveying conduits 20A and 20B may be chosen to correspond to the smallest volume possible, i.e. to reduce fluid dead volume. In some variations of the employment illustrated in FIGS. 5A and 5B, the first fluid conveying conduits 16A and 16B and/or the second fluid conveying conduits 18A and 18B may be segments of the same fluid conveying conduit.

Illustrating again by example, the first valve 12A of the valve construction 36A and the first valve 12B of the valve construction 36B are moved to their first positions. The fluid to be metered, i.e. first fluid, flows from the first fluid conveying conduit 16A of the valve construction 36A through the third fluid conveying conduit 20A, through the fourth fluid conveying conduit 22 to the third fluid conveying conduit 20B and the first valve 12B of the valve construction 36B to the first fluid conveying conduit 16B of the valve construction 36B. The first valves 12A and 12B are moved toward their second positions.

The second valve 14A of the valve construction 36A and the second valve 14B of the valve construction 36B are moved to their first positions. Second fluid flows from the second fluid conveying conduit 18A of the valve construction 36A through the third fluid conveying conduit 20A, through the fourth fluid conveying conduit 22 to the third fluid conveying conduit 20B and the second valve 14B to the second fluid conveying conduit 18B of the valve construction 36B. In this manner, the second fluid conveying conduit 18B contains a metered amount of first fluid mixed, i.e. integrated, with an amount of second fluid determined by the time during which the second valves 14A and/or 14B remain at the first position. Given this construction, no wash sequence is required during the above operation.

As pointed out earlier, employments of the valve constructions described herein may require modification of the valve constructions to address particular needs. For instance, the employment illustrated in FIG. 8 is substantially similar to the employment illustrated in FIGS. 5A and 5B, hence the like reference names and numerals However, the employment of FIG. 8 represents a "mirror image," taken about a lateral midline of the fourth fluid conveying conduit 22 of FIGS. 5A and 5B, of the employment of FIGS. 5A and 5B.

Figure 8:
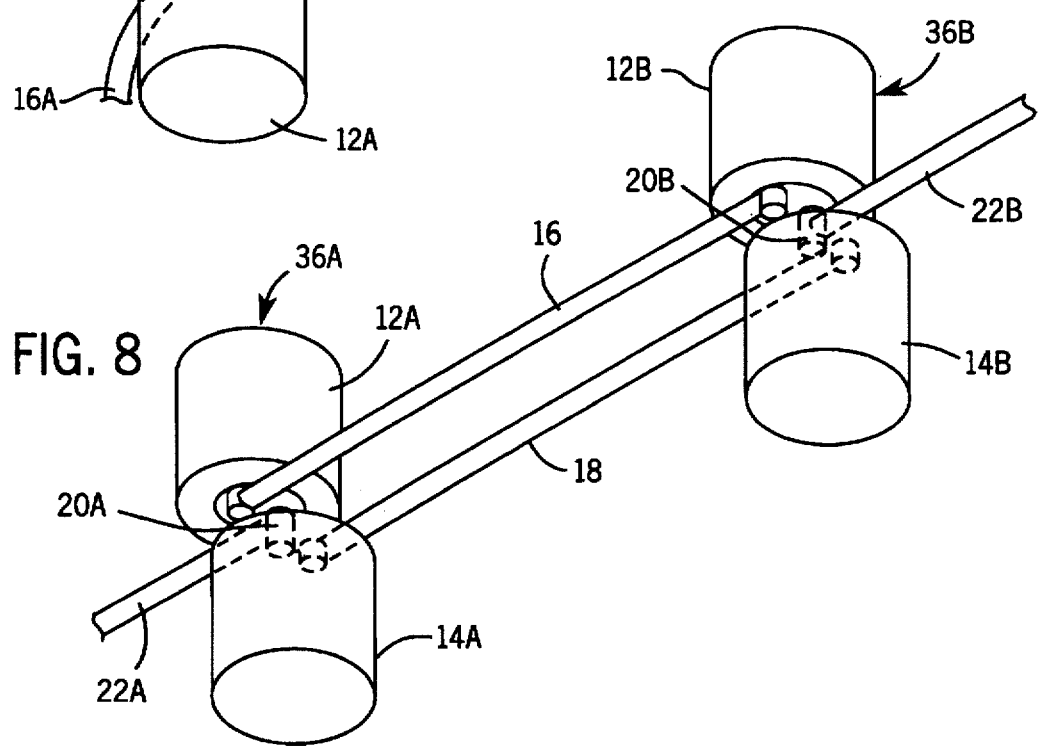
FIG. 8 is a generic isometric view of a valve construction related to the valve construction shown in FIGS. 5A and 5B.

Specifically, in the employment of FIG. 8, the first valve 12A of the valve construction 36A is fluidly connected with the first valve 12B of the valve construction 36B by a common first fluid conveying conduit 16. Likewise, the second valve 14A of the valve construction 36A is fluidly connected with the second valve 14B of the valve construction 36B by a common second fluid conveying conduit 18. The common first and second fluid conveying conduits 16 and 18 may have different dimensions, thereby corresponding to different volumes of fluid. The first valves 12A and 12B are fluidly connected with, respectively, the second valves 14A and 14B by respective third fluid conveying conduits 20A and 20B. The third fluid conveying conduit 20A is fluidly connected with the fourth fluid conveying conduit 22A and the third fluid conveying conduit 20B is fluidly connected with the fourth fluid conveying conduit 22B.

In this employment, fluid may flow in any desired direction. For instance, fluid may flow from the fourth fluid conveying conduit 22B into the third fluid conveying conduit 20B. Fluid may flow from the third fluid conveying conduit 20B into the first fluid conveying conduit 16 and/or the second fluid conveying conduit 18. Fluid may flow from the first fluid conveying conduit 16 and/or the second fluid conveying conduit 18 toward the third fluid conveying conduit 20A and the fourth fluid conveying conduit 22A. Accordingly, this employment may be used to meter fluids, split fluids into multiple segments, etc.

Figure 9:
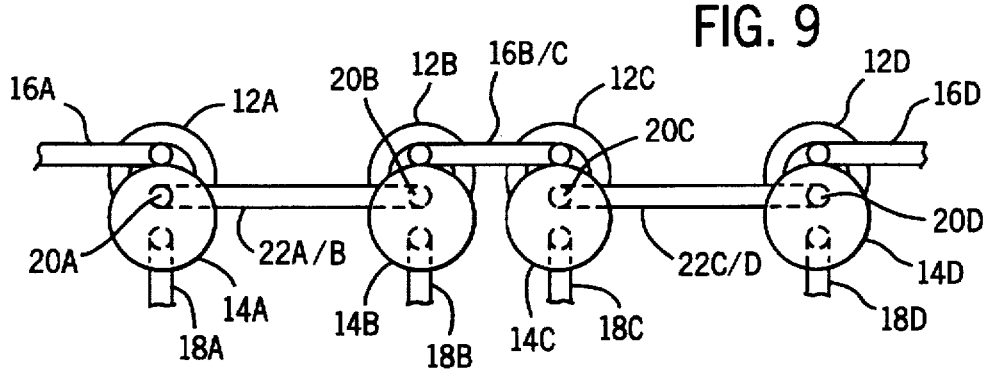
FIG. 9 is a schematic view of yet another valve construction described herein
Figure 6:
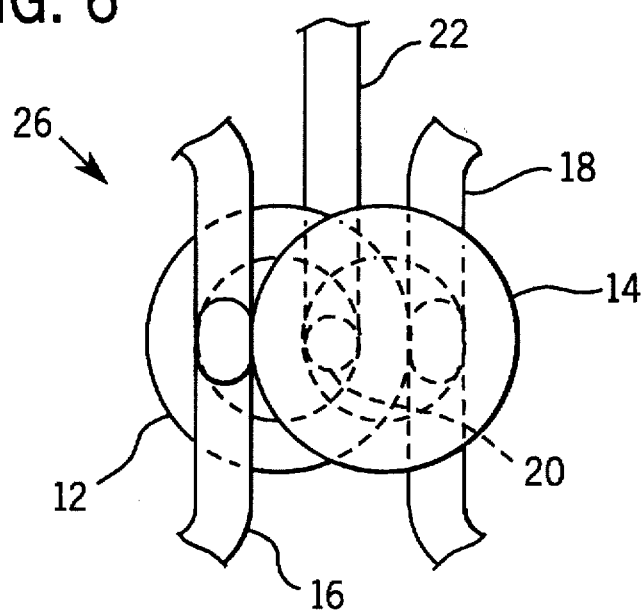
FIG. 6 is a sectional view of yet another valve construction described herein.

Another valve construction illustrated in FIG. 9 represents one embodiment of a combination of some of the various constructions described herein, hence the like reference names and numerals. In one utilization, this valve construction may replace the valve construction 24 shown in FIG. 7.

Illustrating by example, a first fluid, such as a blood sample and the like, may flow through the first fluid conveying conduit 16A toward the first fluid conveying conduit 16D. Using techniques described above, amounts of the first fluid may be metered and retained in the fourth fluid conveying conduits 22A/B and 22C/D. For instance, a first amount of blood sample for red blood cell measurement may be disposed in the fourth fluid conveying conduit 22A/B while a second amount of blood sample, which may be different in volume from the first amount, may be disposed in the fourth fluid conveying conduit 22C/D. The second amount of blood sample may be used for white blood cell analysis.

A second fluid, such as a reagent for performing red blood cell analysis and the like, may flow through the second fluid conveying conduit 18A toward the fourth fluid conveying conduit 22A/B. The second fluid encounters the first fluid in the fourth fluid conveying conduit 22A/B. The first fluid and the second fluid move through the second fluid conveying conduit 18B.

A third fluid, such as a reagent for performing white blood cell analysis and the like, may flow through the second fluid conveying conduit 18C toward the fourth fluid conveying conduit 22C/D. The third fluid encounters the first fluid in the fourth fluid conveying conduit 22C/D. The first fluid and the third fluid move through the second fluid conveying conduit 18D. In this example, two dilutions of blood sample are produced for analysis. Of course, other utilizations are also possible.

What is claimed is:

1. A valve construction comprising:

(a) a first valve having a first diaphragm defining a first plane;

(b) a second valve having a second diaphragm defining a second plane, the second plane being non co-planar with the first plane;

(c) a first fluid conveying conduit fluidly conveying a first fluid fluidly connected with but not terminating at the first valve;

(d) a second fluid conveying conduit fluidly conveying a second fluid fluidly connected with but not terminating at the second valve; and (e) a third fluid conveying conduit being outside of the first plane and the second plane and being fluidly connected with the first valve and the second valve; the first diaphragm being movable between a first position where first fluid flows between the first fluid conveying conduit and the third fluid conveying conduit, and a second position where first fluid does not flow between the first fluid conveying conduit and the third fluid conveying conduit; and the second diaphragm being movable between a first position where the second fluid flows between the second fluid conveying conduit and the third fluid conveying conduit, and a second position where the second fluid does not flow between the second fluid conveying conduit and the third fluid conveying conduit.

2. A valve construction as defined in claim 1 wherein the third fluid conveying conduit has dimensions predetermined to correspond to a desired amount of fluid.

3. A valve construction as defined in claim 1 further comprising:

(f) a fourth fluid conveying conduit being outside of the first plane and the second plane and being fluidly connected with the third fluid conveying conduit.

4. A valve construction as defined in claim 1 wherein the third fluid conveying conduit encompasses a volume of about 0.5 µl.

5. A valve construction comprising:

(a) a first fluid conveying conduit conveying a first fluid;

(b) a first valve including a first diaphragm defining a first plane and being fluidly connected with the first fluid conveying conduit such that the first fluid conveying conduit does not terminate at the first valve, the first diaphragm being movable between a first position where first fluid flows through the first valve and a second position where first fluid does not flow through the first valve;

(c) a second fluid conveying conduit conveying a second fluid;

(d) a second valve including a second diaphragm defining a second plane, the second plane being non co-planar with the first plane, and the second valve being fluidly connected with the second fluid conveying conduit such that the second fluid conveying conduit does not terminate at the second valve, the second diaphragm being movable between a first position where second fluid flows through the second valve and a second position where second fluid does not flow through the second valve; and (e) a third fluid conveying conduit being outside of the first plane and the second plane and being fluidly connected with both the first valve and the second valve for conveying at least one of the first fluid and the second fluid.

6. A valve construction as defined in claim 5 wherein the third fluid conveying conduit has dimensions predetermined to correspond to a desired amount of fluid.

7. A valve construction as defined in claim 5 further comprising:

(f) a fourth fluid conveying conduit being outside of the first plane and the second plane and being fluidly connected with the third fluid conveying conduit.

8. A valve construction as defined in claim 5 wherein the third fluid conveying conduit encompasses a volume of about 0.5 µl.

9. A valve construction comprising:

(a) a first valve having a first diaphragm defining a first plane;

(b) a second valve having a second diaphragm defining a second plane, the second plane being non co-planar with the first plane;

(c) a first fluid conveying conduit fluidly conveying a first fluid fluidly connected with but not terminating at the first valve;

(d) a second fluid conveying conduit fluidly conveying a second fluid fluidly connected with but not terminating at the second valve;

(e) a third fluid conveying conduit being outside of the first plane and the second plane and being fluidly connected with the first valve and the second valve; the first diaphragm being movable between a first position where first fluid flows between the first fluid conveying conduit and the third fluid conveying conduit, and a second position where first fluid does not flow between the first fluid conveying conduit and the third fluid conveying conduit; and the second diaphragm being movable between a first position where the second fluid flows between the second fluid conveying conduit and the third fluid conveying conduit, and a second position where the second fluid does not flow between the second fluid conveying conduit and the third fluid conveying conduit; and (f) a fourth fluid conveying conduit being outside of the first plane and the second plane being fluidly connected with the third fluid conveying conduit.

\* \* \* \* \*